United States Patent
Bullard

(10) Patent No.: US 10,197,792 B2
(45) Date of Patent: Feb. 5, 2019

(54) REACTION COMPENSATED STEERABLE PLATFORM

(71) Applicant: Raytheon Company, Waltham, MA (US)

(72) Inventor: Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 167 days.

(21) Appl. No.: 15/050,359

(22) Filed: Feb. 22, 2016

(65) Prior Publication Data
US 2017/0242243 A1 Aug. 24, 2017

(51) Int. Cl.
| | | |
|---|---|---|
| *B64G 1/22* | (2006.01) | |
| *G05D 1/08* | (2006.01) | |
| *G02B 26/08* | (2006.01) | |
| *G02B 27/64* | (2006.01) | |
| *G02B 7/182* | (2006.01) | |
| *H02K 41/035* | (2006.01) | |

(52) U.S. Cl.
CPC .......... *G02B 26/0816* (2013.01); *B64G 1/22* (2013.01); *G02B 7/1827* (2013.01); *G02B 27/644* (2013.01); *G05D 1/0883* (2013.01); *H02K 41/0354* (2013.01)

(58) Field of Classification Search
CPC .... G02B 7/001; G02B 7/1822; G02B 7/1827; G02B 7/1828; G02B 7/183; G02B 7/198; G02B 27/64; G02B 27/644; G02B 27/646; G02B 27/648; G02B 26/0816; H02K 41/0354; B64G 1/22; G05D 1/0883
See application file for complete search history.

(56) References Cited

U.S. PATENT DOCUMENTS

| | | | |
|---|---|---|---|
| 5,012,170 | A | 4/1991 | Atlas |
| 5,283,682 | A | 2/1994 | Ostaszewski |
| 5,751,078 | A | 5/1998 | Loewenthal |

(Continued)

FOREIGN PATENT DOCUMENTS

| | | |
|---|---|---|
| EP | 0381574 A1 | 8/1990 |
| GB | 1146847 | 3/1969 |

OTHER PUBLICATIONS

Ball Aerospace & Technologies Corp., Wide Angle Steering Mirror, Ball Aerospace brochure, Aug. 2010, 2 pages, Ball Aerospace & Technologies Corp.

(Continued)

*Primary Examiner* — Kimberly N. Kakalec

(57) ABSTRACT

A reaction compensated steerable platform device is disclosed. The reaction compensated steerable platform device can include a base, a steerable platform movably coupled to the base, and a reaction mass movably coupled to the base. The reaction compensated steerable platform device can also include a primary actuator coupled to the steerable platform and the base to cause movement of the steerable platform. The reaction compensated steerable platform device can further include a secondary actuator coupled to the reaction mass and the base to cause movement of the reaction mass. In addition, the reaction compensated steerable platform device can also include a load sensor configured to provide feedback for actuation of the secondary actuator, such that the reaction mass moves to compensate for a load induced on a support structure by the movement of the steerable platform.

17 Claims, 3 Drawing Sheets

(56) References Cited

U.S. PATENT DOCUMENTS

| | | | | |
|---|---|---|---|---|
| 7,009,752 | B1* | 3/2006 | Lorell | G02B 7/1821 359/198.1 |
| 9,658,427 | B2 | 5/2017 | Bullard et al. | |
| 2003/0184724 | A1 | 10/2003 | Ono et al. | |
| 2008/0166213 | A1* | 7/2008 | Hunter | H01L 21/68 414/754 |
| 2012/0241268 | A1 | 9/2012 | Laro et al. | |
| 2014/0268383 | A1* | 9/2014 | Bullard | G02B 7/182 359/875 |
| 2015/0142182 | A1* | 5/2015 | Kimura | F16F 15/002 700/280 |

OTHER PUBLICATIONS

Bullard et al., Responder fast sterring mirror, SPIE Remote Sensing, Oct. 24, 2013, 7 pages, vol. 8889, Proceedings of SPIE, Germany.

Henderson, Commercial Fast Steering Mirrors, Optics in Motion LLC, Sep. 27, 2009, 12 pages.

Jones et al., State space representation of optical systems, SPIE International Society for Optical Engineering Proceedings, Apr. 28, 2009, 12 pages, vol. 7338, SPIE, Bellingham, Washington.

Left Hand Design Corporation, Fine-Steering Mirrors, to the best of applicant's knowledge article was available before the application filed, 20 pages, Left Hand Design Corporation.

Meline et al., Universal beam steering mirror design using the cross blade flexure, Acquisition, Tracking, and Pointing VI, Nov. 25, 1992, vol. 1697, SPIE Proceedings.

International Search Report for International Application No. PCT/US2016/068334 dated Apr. 7, 2017, 12 pages.

International Search Report for International Application No. PCT/US2016/068345 dated Apr. 10, 2017, 14 pages.

* cited by examiner

REACTION COMPENSATED STEERABLE PLATFORM

BACKGROUND

Fast moving steering mirrors (FSM) (also known as "beam steering mirrors") are commonly used in high-performance electro-optical sensors or laser systems for pointing laser beams or stabilizing the line of sight of an optical sensor. In many applications the FSM is large enough (e.g., about 2 inch to about 20 inch aperture mirror) that motion of the mirror must be implemented in a way that its exported reaction loads (e.g., "kickback" torque and/or force due to acceleration of the mirror) are compensated for by a mass moving in the opposite direction of the mirror. To be effective, the reaction mass must be driven in such a way that the phase error with the mirror is extremely low to ensure that the exported load is minimized. This is often accomplished by actively driving the reaction mass with a dedicated separate set of actuators and tilt position sensors.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
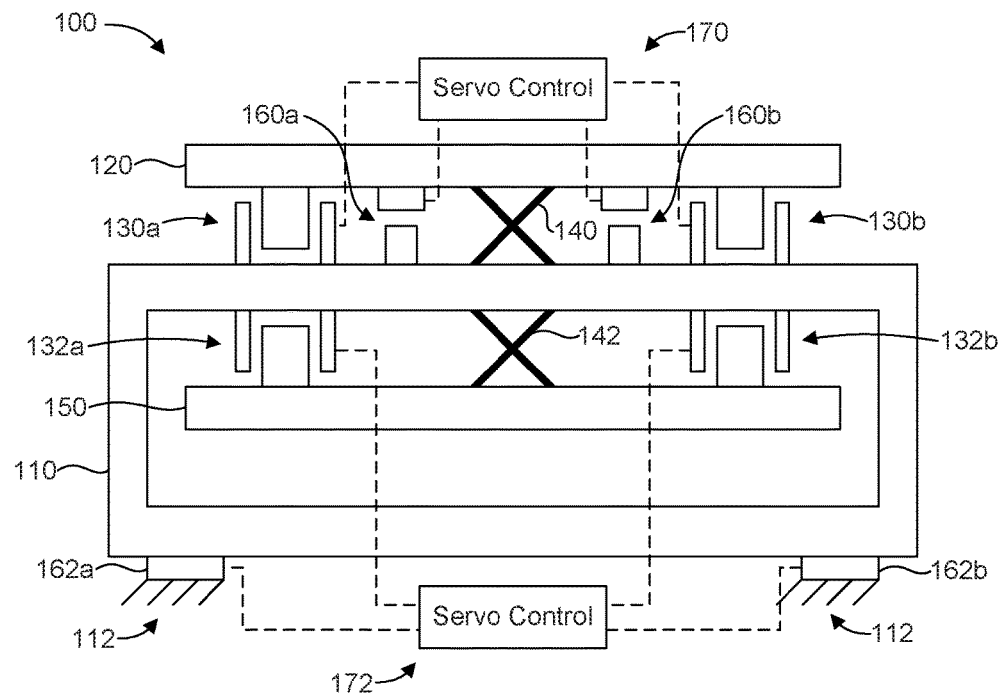
FIG. 1 is a schematic diagram of a two axis reaction compensated steerable platform device in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although typical active reaction compensated steering mirrors are effective at cancelling or eliminating much of the reaction loads generated by steering the mirror, such configurations still suffer from residual or exported loads that remain uncompensated for by the reaction mass. The magnitude of the exported loads for active systems depends largely on the balance and alignment (e.g., imperfections and/or tolerances) of the mirror and the reaction mass, which is difficult to reduce or minimize without significant expense. Thus, providing a low-cost solution for improving performance over a typical active reaction compensated steering mirror is desirable.

Accordingly, in an example, a reaction compensated steerable platform device is disclosed that can measure and directly compensate for the exported loads generated by movement of a reaction mass, thereby accommodating differences in balance and alignment between a steerable platform and a reaction mass. The reaction compensated steerable platform device can include a base, a steerable platform movably coupled to the base, and a reaction mass movably coupled to the base. The reaction compensated steerable platform device can also include a primary actuator coupled to the steerable platform and the base to cause movement of the steerable platform. The reaction compensated steerable platform device can further include a secondary actuator coupled to the reaction mass and the base to cause movement of the reaction mass. In addition, the reaction compensated steerable platform device can also include a load sensor configured to provide feedback for actuation of the secondary actuator, such that the reaction mass moves to compensate for a load induced on a support structure by the movement of the steerable platform.

In another example, a reaction compensated steerable platform system is also disclosed that can include a support structure and a reaction compensated steerable platform. The reaction compensated steerable platform can include a base coupled to the support structure, a steerable platform movably coupled to the base, and a reaction mass movably coupled to the base. The reaction compensated steerable platform can also include a primary actuator coupled to the steerable platform and the base to cause movement of the steerable platform. The reaction compensated steerable platform can further include a secondary actuator coupled to the reaction mass and the base to cause movement of the reaction mass. In addition, the reaction compensated steerable platform can include a load sensor configured to provide feedback for actuation of the secondary actuator, such that the reaction mass moves to compensate for a load induced on the support structure by the movement of the steerable platform.

FIG. 1 illustrates a schematic diagram of a reaction compensated steerable platform device 100 in accordance with another example of the present disclosure. The device 100 can include a base 110 that can support various components of the reaction compensated steerable platform device 100, as described herein. The device 100 can also include a steerable platform 120 movably coupled to the base 110, such as by a pivot connector assembly, which can include one or more pivot connectors 140. The device 100 can include one or more primary actuators 130a, 130b (e.g., force actuators) to cause movement of the steerable platform 120. The loads generated by movement of the steerable platform can be "exported" from a steerable platform device to a support structure for the device, which may become evident at higher speeds or frequencies. For example, a steerable platform device may form a part of a FSM, which is mounted to a support structure of a satellite. Loads from the FSM as generated by movement of the steerable platform can be exported to the support structure of the satellite, which can interfere with other components and systems of the satellite, such as by exciting structural vibration modes and causing unwanted structural vibrations. Thus, the device 100 can also include a reaction mass 150 movably coupled to the base 110 to provide cancellation of loads (e.g., torques and/or forces) generated by movement of the steerable platform 120. The reaction mass 150 can be movably coupled to the base 110 by a connector assembly, which can include one or more connectors 142. The device 100 can further include one or more secondary actuators 132a, 132b to cause movement of the reaction mass 150. The connectors 140, 142 can include any suitable type of connector or mechanism for providing pivotal or rotational movement, such as a flexible connector (e.g., a pivot flexure), a bearing connector (e.g., ball bearings), a bushing connector, etc. Thus, connectors referred to herein may include any suitable type of pivotal or rotational connector known in the art.

As shown in FIG. 1, the primary actuators 130a, 130b can be coupled to the base 110 and the steerable platform 120, such that actuation of the primary actuators 130a, 130b causes the steerable platform 120 to move. Similarly, the secondary actuators 132a, 132b can be coupled to the base 110 and the reaction mass 150, such that actuation of the secondary actuators 132a, 132b causes the reaction mass 150 to move. Such a configuration is referred to generally as an "active" reaction mass load cancellation configuration due to the secondary actuators 132a, 132b actively causing the reaction mass 150 to move in opposition to the steerable platform 120, which is caused to move by the primary actuators 130a, 130b.

Figure 2:
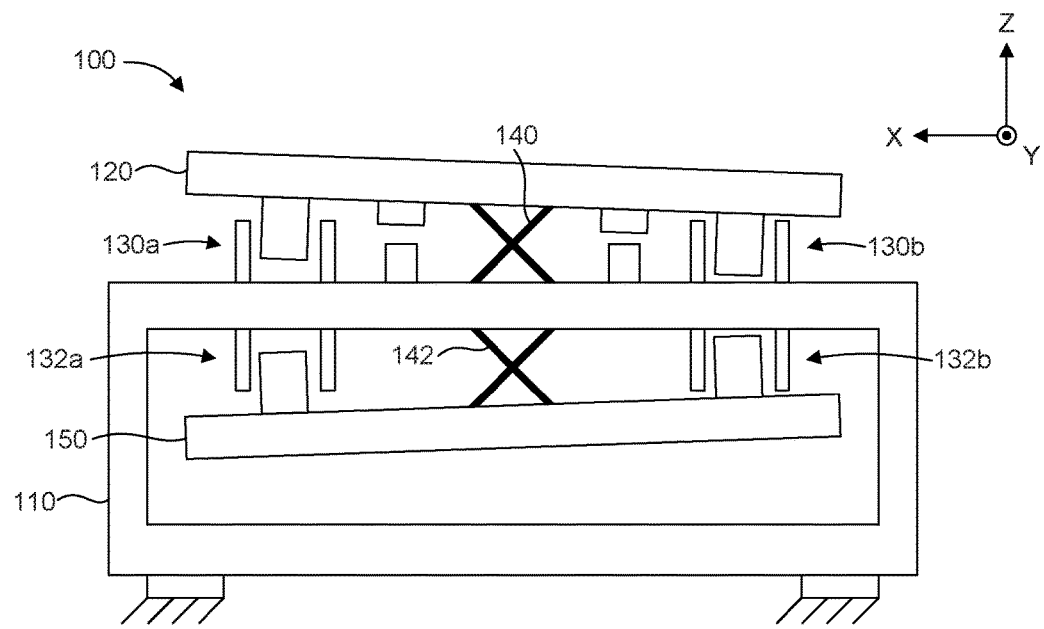
FIG. 2 illustrates tilting of the two axis reaction compensated steerable platform device of FIG. 1.

The primary actuators 130a, 130b and secondary actuators 132a, 132b can comprise voice coil or similar force actuators, which can extend/retract to cause movement of the steerable platform 120 and the reaction mass 150, respectively. For example, the illustration of FIG. 1 shows primary actuators 130a, 130b on opposite sides of the connector 140. One primary actuator 130a can extend (i.e., "push") and the other primary actuator 130b can retract (i.e., "pull") to cause rotation of the steerable platform 120, such as about a y-axis, as shown in FIG. 2. The secondary actuators 132a, 132b are also shown on opposite sides of the connector 142. One secondary actuator 132a can extend (i.e., "push") and the other secondary actuator 132b can retract (i.e., "pull") to cause rotation of the reaction mass 150, such as about a y-axis, as shown in FIG. 2. A similar arrangement of primary and secondary actuators and connectors (not shown) can be included to facilitate rotation of the steerable 120 platform and the reaction mass 150 about another axis, such as the x-axis. Thus, primary and secondary actuators and connectors can be configured to provide for tilting of the steerable platform 120 and the reaction mass 150 in two dimensions or degrees of freedom.

The device 100 can include one or more position sensors 160a, 160b that can be mounted on the base 110 and/or the steerable platform 120 and used to monitor the position (e.g., the angular position) of the steerable platform 120 relative to the base 110. The device 100 can include one or more load sensors 162a, 162b (such as a force and/or torque sensor) configured to provide feedback for actuation of the secondary actuators 132a, 132b. The load sensors 162a, 162b can be located or disposed where the base 110 is coupled to a support structure (indicated by the fixed coupling at 112) for the device 100 to which the base 110 is coupled, such as coupled between the base 110 and the support structure. The device 100 coupled to a support structure (e.g., a satellite or a portion of a satellite) can form a reaction compensated steerable platform system in accordance with the present disclosure. The primary actuators 130a, 130b can be controlled by a servo or control loop 170 using position feedback from the steerable platform 120 (e.g., the position sensors 160a, 160b between the steerable platform 120 and the base 110). The secondary actuators 132a, 132b can be controlled by a servo or control loop 172 using force and/or torque feedback from the load sensors 162a, 162b at the base mount (indicated at 112, e.g., between the base 110 and a support structure in support of the device 100). Thus, the secondary actuators 132a, 132b operate in the control loop 172, which can utilize force and/or torque feedback of the base 110 (which includes the base and everything supported by the base), in order to directly measure loads induced by the movement of the steerable platform and move the reaction mass 150 to offset or cancel the loads. In other words, the load sensors 162a, 162b can provide force and/or torque feedback for actuation of the secondary actuators 132a, 132b to cause the reaction mass 150 to move in a manner that compensates for loads induced by the movement of the steerable platform 120.

Using feedback from the load sensors 162a, 162b to directly sense exported loads allows the reaction mass 150 to be independently controlled by the secondary actuators 132a, 132b to directly cancel or eliminate the exported loads. Using feedback from the load sensors 162a, 162b therefore allows the reaction mass 150 to move in a manner that actively offsets and cancels actual loads generated by the movement of the steerable platform 120, instead of merely attempting to offset torque based on movement and position. Thus, the device 100 can accommodate differences in balance and alignment between the steerable platform 120 and the reaction mass 150 that would otherwise go unaccounted for in a typical active reaction compensated steering mirror.

In a two axis device, two control loops can be utilized to control operation of the primary actuators. For example, one control loop for each axis using position feedback of the steerable platform 120 relative to the base 110. In addition, a two axis device can include two control loops to control operation of the secondary actuators 132a, 132b. For example, one control loop for each axis using load feedback at the base mounting location 112 with a supporting structure. In one aspect, the control or servo loop for actuation of the secondary actuators 132a, 132b can use information from one or more accelerometers located at a desired vibration sensitive interface or location.

A servo loop can be used to control actuation of the primary actuators 130a, 130b for movement of the steerable platform 120 in each degree of freedom. Similarly, a servo loop can be used to control actuation of the secondary actuators 132*a*, 132*b* for movement of the reaction mass 150 in each degree of freedom. In one aspect, the control or servo loop for actuation of the primary and/or secondary actuators can use external feedback from an optical sensor (e.g., a quad cell, a photopot, etc.) measuring or sensing the steerable platform 120 and/or the reaction mass 150.

Figure 3A:
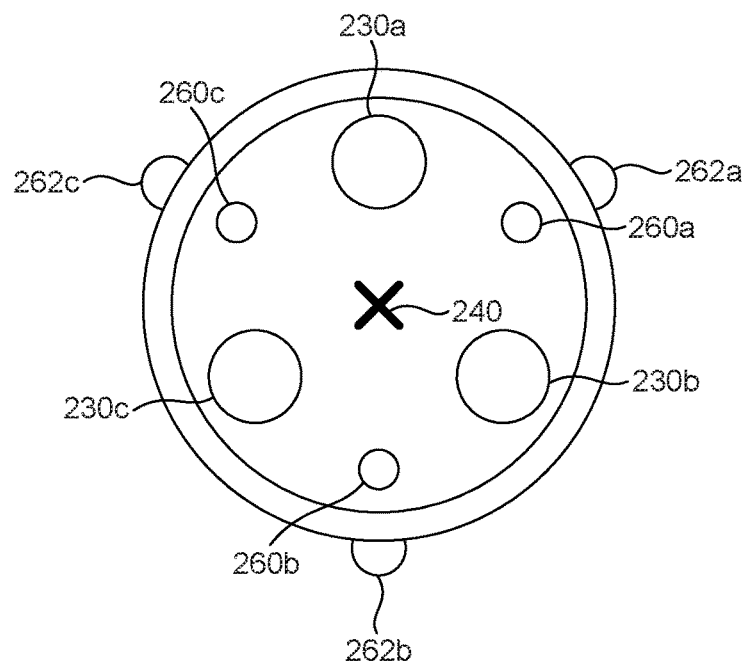
FIG. 3A is a schematic diagram top view of a two axis reaction compensated steerable platform device in accordance with an example of the present disclosure.
Figure 3B:
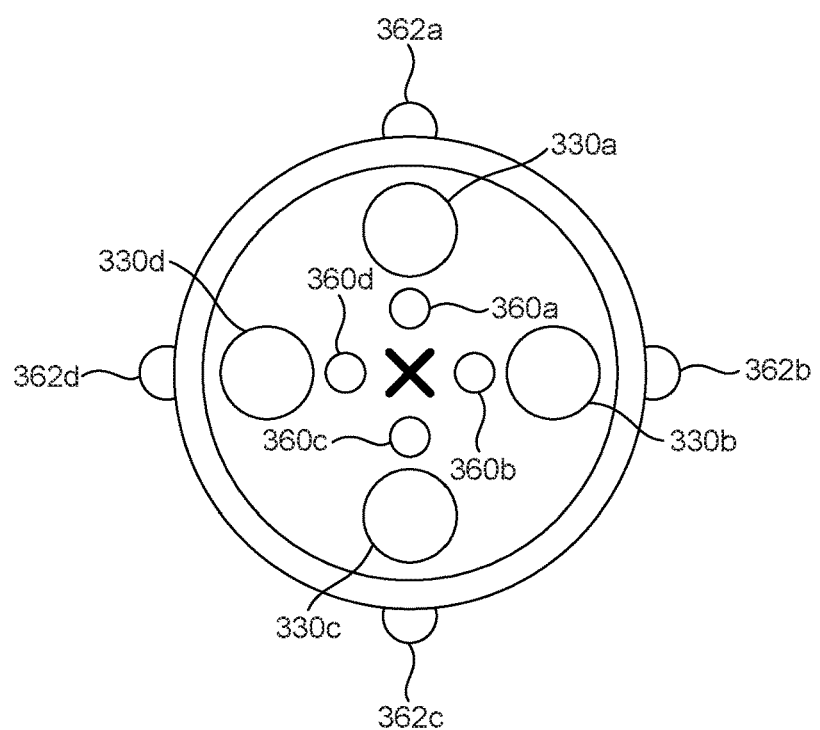
FIG. 3B is a schematic diagram top view of a two axis reaction compensated steerable platform device in accordance with another example of the present disclosure.

It should be recognized that any suitable number of primary actuators can be utilized, although, typically, a reaction compensated steerable platform device will include three or four primary actuators to facilitate rotation or angular movement of a steerable platform about two orthogonal axes. For example, as illustrated in FIG. 3A, three primary actuators 230*a-c* can be utilized and angularly spaced apart from one another at suitable angles, such as 120 degrees, although the primary actuators can be disposed in any angular configuration. In another example, illustrated in FIG. 3B, four primary actuators 330*a-d* can be utilized, such as two primary actuators per rotational degree of freedom. In the schematic top views of the reaction compensated steerable platform devices shown in FIGS. 3A and 3B, the steerable platforms have been omitted for clarity to illustrate components that would otherwise be obscured.

In one aspect, the connectors 140 can constrain the position of the steerable platform 120 in a flexible manner, enabling the steerable platform 120 to be controlled while still allowing for freedom of motion in one or more degrees of freedom. The connectors 140 can have a certain degree of mechanical flexibility in combination with a degree of mechanical rigidity. Any suitable number of connectors 140 can be utilized in any suitable configuration to facilitate movement of the steerable platform in one or more degrees of freedom, such as rotational degrees of freedom about two orthogonal axes. For example, an individual connector 240 can be configured to provide movement in two degrees of freedom (FIGS. 3A and 3B), such as rotation about two axes. In another example, one or more connectors can be utilized to facilitate movement in a single rotational degree of freedom. In this case, an individual connector (e.g., a cross-blade flexure pivot or a pivot flex bearing) can be configured to provide movement in only a single degree of freedom, such as rotation about an axis. In an additional example, three connectors can be utilized and angularly spaced apart from one another at suitable angles, such as 120 degrees, although the connectors can be disposed in any angular configuration. In this case, an individual connector can be configured to provide movement in two degrees of freedom (e.g., two rotational) or three degrees of freedom (e.g., two rotational and one translational), as discussed further below.

The connectors 140 and actuators 130*a*, 130*b* can therefore be utilized to adjust the tilt angle of the steerable platform 120 in the x-z plane and/or the y-z plane. Tilting in the x-z plane and the y-z plane may be referred to as a rotation about the y-axis and a rotation about the x-axis, respectively. The reaction mass 150 can be movably coupled to the base 110 (i.e., by suitable connectors 142) in a manner similar to the steerable platform 120 to provide for movement in similar degrees of freedom, such that the reaction mass 150 can move opposite the steerable platform 120 to compensate for loads induced by movement of the steerable platform 120.

Any suitable number of position sensors 160*a*, 160*b* can be utilized in any suitable configuration to determine position of the steerable platform 120 in one or more degrees of freedom, such as rotational degrees of freedom about two orthogonal axes. For example, as illustrated in FIG. 3A, three position sensors 260*a-c* can be utilized and angularly spaced apart from one another at suitable angles, such as 120 degrees, although the position sensors can be disposed in any angular configuration. In another example, illustrated in FIG. 3B, four position sensors 360*a-d* can be utilized, such as two position sensors per rotational degree of freedom. The position sensors disclosed herein can be any suitable type of position sensor, such as an interferometric position sensor, an inductive position sensor, etc. In one aspect, the position sensors can be configured to determine the position of the steerable platform in one or more dimensions. Position sensors with a large dynamic range are desirable since such sensors can provide precise position information over a large range of distances.

Any suitable number of load sensors 162*a*, 162*b* can be utilized in any suitable configuration to determine loads in one or more degrees of freedom, such as rotational degrees of freedom about two orthogonal axes. For example, as illustrated in FIG. 3A, three load sensors 262*a-c* can be utilized and angularly spaced apart from one another at suitable angles, such as 120 degrees, although the load sensors can be disposed in any angular configuration. In another example, illustrated in FIG. 3B, four load 362*a-d* sensors can be utilized, such as two load sensors per rotational degree of freedom. A load sensor will be referred to generally as a sensor that can measure force and/or torque (e.g., a load cell), which can be measured or sensed in any suitable manner. For example, a load sensor can measure or sense one or more quantities that may be used to derive a force or a torque, such as utilizing an accelerometer. In a specific example, a load sensor can measure force in order to derive the torque.

The device 100 can include any suitable number of primary actuators 130*a*, 130*b* and secondary actuators 132*a*, 132*b*, as described herein. For example, three secondary actuators can be utilized and angularly spaced apart from one another at suitable angles, such as 120 degrees, although the secondary actuators can be disposed in any angular configuration. In another example, four secondary actuators can be utilized, such as two secondary actuators per rotational degree of freedom. The reaction compensated steerable platform device 100 is an example of a two axis device (e.g., rotation about two orthogonal axes).

The actuators disclosed herein can be any suitable type of actuator, such as a voice coil actuator, a Lorenz force actuator, a current-mode actuator, an electrostrictive actuator, a piezoelectric actuator, a pneumatic actuator, a hydraulic actuator, an electromechanical screw-jack actuator, etc. In one example, a moveable support member fabricated using a spring to provide a repulsive force, and a solenoid to provide an attractive force can be used.

In some embodiments, an optical assembly (not shown) will be mounted to the steerable platform 120 to provide a steerable mirror (e.g., FSM). By way of example, the steerable mirror can have a reflective surface, such as in the shape of an annulus as can be found in telescopes commonly referred to as Cassegrain telescopes. The reaction compensated steerable platform device 100 can be utilized in other applications as well, such as air or space borne telescopes, laser systems, laser radar systems, and the like. The technology has been found particularly effective as a platform to support a mirror for line-of-sight scanning and stabilization or other precision pointing uses. Accordingly, in one aspect, the steerable platform 120 and/or the base 110 can be configured to provide a rigid support for an optical assembly.

Figure 4:
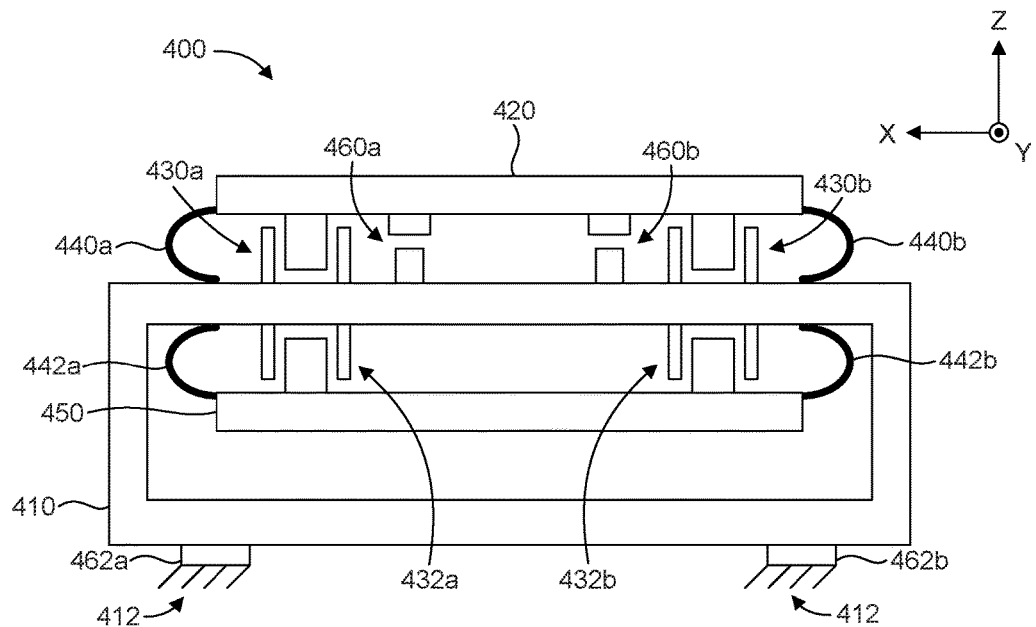
FIG. 4 is a schematic diagram of a three axis reaction compensated steerable platform device in accordance with an example of the present disclosure.

FIG. 4 illustrates a schematic diagram of a reaction compensated steerable platform device 400 in accordance with another example of the present disclosure. The device 400 is similar to the device 100 in many respects, such as utilizing an active reaction mass configuration with a secondary actuator 432a, 432b for a reaction mass 450 controlled by feedback from a load sensor 462a, 462b between a base 410 and a supporting structure (at 412).

In this case, connectors 440a, 440b of a steerable platform 420 to the base 410 and connectors 442a, 442b of the reaction mass 450 to the base 410 are configured to facilitate relative movement in a translational degree of freedom, in addition to one or more rotational degrees of freedom. Furthermore, the primary actuators 430a, 430b and the secondary actuators 432a, 432b can be configured to "piston" (e.g., a linear stroke) to provide movement of the steerable platform 420 and the reaction mass 450 in a translational degree of freedom, in addition to one or more rotational degrees of freedom, thus providing a three axis device. Accordingly, position sensors 460a, 460b of the device 400 can be configured to sense position in the three degrees of freedom (two rotational and one translational) to provide position feedback for the primary actuators 430a, 430b. The piston action of the actuators can cause movement of the steerable platform 420 (e.g., to provide pivoting about a virtual pivot point) that results in reaction force as well as torque that may be exported from the device 400. Accordingly, the load sensors 462a, 462b of the device 400 can be configured to sense loads in the three degrees of freedom (two rotational and one translational) to provide load feedback for the secondary actuators 432a, 432b to facilitate cancelling or offsetting reaction loads in three degrees of freedom.

In one example, the connectors can comprise a C-flexure, a U-flexure, a J-flexure, or the like. The connector in this example can be formed in the shape of the letter "C", "U", or "J" to provide flexibility in the z-direction. Such connectors can act as a constraint on the position of the steerable platform 420 or the reaction mass 450, yet can be flexible in the z-direction, enabling the supported structure to translate in the z-direction. The connectors can also be pivotal or rotational about one or more axes of rotation, such as about the x-axis and/or y-axis. A connector can include any suitable device or mechanism to provide movement in a translational degree of freedom, such as a linkage mechanism or a linear bearing.

Figure 5:
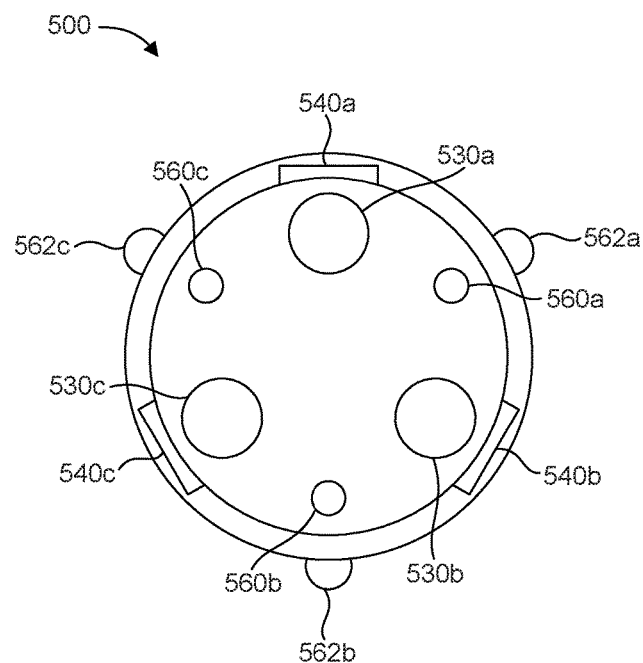
FIG. 5 is a schematic diagram top view of a three axis reaction compensated steerable platform device in accordance with an example of the present disclosure.

As with other examples, a three axis device 500 can have actuators 530a-c (secondary actuators obscured from view), position sensors 560a-c, load sensors 562a-c, and connectors 540a-c included in any suitable quantity and configuration, such as having three of each type of component disposed at 120 degrees from one another, as illustrated in FIG. 5.

In accordance with one embodiment of the present invention, a method for facilitating compensation of a reaction in a steerable platform device is disclosed. The method can include obtaining a steerable platform device, having a base, a steerable platform movably coupled to the base, a reaction mass movably coupled to the base, a primary actuator coupled to the steerable platform and the base to cause movement of the steerable platform, and a secondary actuator coupled to the reaction mass and the base to cause movement of the reaction mass. Additionally, the method can include facilitating sensing of a load induced on a support structure by the movement of the steerable platform to provide feedback for actuation of the secondary actuator, such that the reaction mass moves to compensate for the load. It is noted that no specific order is required in this method, though generally in one embodiment, these method steps can be carried out sequentially.

In one aspect of the method, facilitating sensing of a load can comprise obtaining a load sensor. In another aspect of the method, the load sensor can comprise at least one of a load cell and an accelerometer. In yet another aspect of the method, the load sensor can be coupleable between the base and a support structure.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A reaction compensated steerable platform device, comprising:
 a base;
 a steerable platform movably coupled to the base;
 a reaction mass movably coupled to the base;
 a primary actuator coupled to the steerable platform and
  the base to cause movement of the steerable platform;

a secondary actuator coupled to the reaction mass and the base to cause movement of the reaction mass; and a load sensor coupled to the base and configured to be disposed between the base and a support structure for the reaction compensated steerable platform device, the load sensor being operable to provide feedback for actuation of the secondary actuator, such that the reaction mass moves to compensate for a load induced on the support structure by the movement of the steerable platform.

2. The reaction compensated steerable platform device of claim 1, wherein the load sensor comprises at least one of a load cell and an accelerometer.

3. The reaction compensated steerable platform device of claim 1, wherein each of the couplings of the steerable platform and the reaction mass to the base facilitate relative movement in two rotational degrees of freedom.

4. The reaction compensated steerable platform device of claim 3, wherein each of the couplings of the steerable platform and the reaction mass to the base facilitate relative movement in a translational degree of freedom.

5. The reaction compensated steerable platform device of claim 1, wherein the primary actuator comprises at least three primary actuators.

6. The reaction compensated steerable platform device of claim 1, wherein the secondary actuator comprises at least three secondary actuators.

7. The reaction compensated steerable platform device of claim 1, wherein the steerable platform is movably coupled to the base by a flexure pivot, a bearing, a bushing, or a combination thereof.

8. The reaction compensated steerable platform device of claim 1, wherein the reaction mass is movably coupled to the base by a flexure pivot, a bearing, a bushing, or a combination thereof.

9. A reaction compensated steerable platform system, comprising:
   a support structure; and
   a reaction compensated steerable platform, having
      a base coupled to the support structure,
      a steerable platform movably coupled to the base,
      a reaction mass movably coupled to the base,
      a primary actuator coupled to the steerable platform and the base to cause movement of the steerable platform,
      a secondary actuator coupled to the reaction mass and the base to cause movement of the reaction mass, and
      a load sensor coupled to, and disposed between, the base and the support structure, the load sensor being operable to provide feedback for actuation of the secondary actuator, such that the reaction mass moves to compensate for a load induced on the support structure by the movement of the steerable platform.

10. The system of claim 9, wherein the support structure comprises a portion of a satellite.

11. The system of claim 9, wherein the load sensor comprises at least one of a load cell and an accelerometer.

12. The system of claim 9, wherein each of the couplings of the steerable platform and the reaction mass to the base facilitate relative movement in two rotational degrees of freedom.

13. The system of claim 12, wherein each of the couplings of the steerable platform and the reaction mass to the base facilitate relative movement in a translational degree of freedom.

14. The system of claim 9, wherein the primary actuator comprises at least three primary actuators.

15. The system of claim 9, wherein the steerable platform is movably coupled to the base by a flexure pivot, a bearing, a bushing, or a combination thereof.

16. A method for facilitating compensation of a reaction in a steerable platform device, comprising:
   obtaining a steerable platform device, having
      a base,
      a steerable platform movably coupled to the base,
      a reaction mass movably coupled to the base,
      a primary actuator coupled to the steerable platform and the base to cause movement of the steerable platform, and
      a secondary actuator coupled to the reaction mass and the base to cause movement of the reaction mass; and
   providing a load sensor coupled to the base and configured to be disposed between the base and a support structure for the steerable platform device, the load sensor being operable to sense a load induced on the support structure by the movement of the steerable platform to provide feedback for actuation of the secondary actuator, such that the reaction mass moves to compensate for the load.

17. The method of claim 16, wherein the load sensor comprises at least one of a load cell and an accelerometer.

* * * * *